(12) United States Patent
Newton et al.

(10) Patent No.: US 7,632,763 B2
(45) Date of Patent: *Dec. 15, 2009

(54) ENHANCED THICKNESS FABRIC AND METHOD OF MAKING SAME

(75) Inventors: Mark J. Newton, Perkinsfield (CA); Mark W. Tucker, Waubaushere (CA)

(73) Assignee: Saint Gobain Technical Fabrics America, Inc., Northborough, MA (US)

( * ) Notice: Subject to any disclaimer, the term of this patent is extended or adjusted under 35 U.S.C. 154(b) by 287 days.

This patent is subject to a terminal disclaimer.

(21) Appl. No.: 11/155,129

(22) Filed: Jun. 16, 2005
(Under 37 CFR 1.47)

(65) Prior Publication Data
US 2006/0014457 A1    Jan. 19, 2006

Related U.S. Application Data

(63) Continuation-in-part of application No. 10/742,087, filed on Dec. 19, 2003.

(51) Int. Cl.
B32B 27/04 (2006.01)
B32B 27/12 (2006.01)

(52) U.S. Cl. .............. 442/2; 442/20; 442/43; 442/45; 442/46; 442/49; 442/164; 442/180

(58) Field of Classification Search ........... 442/2, 442/20, 43, 45, 46, 49, 164, 180
See application file for complete search history.

(56) References Cited

U.S. PATENT DOCUMENTS 2,030,668 A    2/1936    Weyerhaeuser et al.
2,324,916 A    7/1943    Duncan et al.
2,541,762 A    2/1951    Heritage
2,897,109 A    7/1959    Voigtman
3,044,919 A    7/1962    Stoneburner
3,095,338 A *  6/1963    Romanin .................. 428/107

(Continued)

FOREIGN PATENT DOCUMENTS

DE    1081205    5/1960

(Continued)

OTHER PUBLICATIONS

Kettenwirkpraxis, trade literature, Mar. 1993, pp. 1-8, translation from German.
Kettenwirkpraxis, trade literature, Jan. 1989, pp. 1-9, translation from German.
Saint-Gobain Vetrotex Twintex Overview, 1 page, 2001.
Saint-Gobain Vetrotex Twintex Material Properties, 3 pages, 2001.

(Continued)

*Primary Examiner*—Ula C Ruddock
(74) *Attorney, Agent, or Firm*—Duane Morris LLP

(57) ABSTRACT

The present invention provides thickened fabrics and reinforcements for use as a spacer or reinforcement for a matrix system. The fabric includes in a first embodiment a woven fabric comprising weft and warp yarns containing glass fibers. A portion of the weft yarns are undulated into a sinusoidal path forming a generally "C" shaped bridge between adjacent warp yarns which results in an increased thickness for the fabric. The fabric is coated with a polymeric resin or bonding agent, for substantially binding the weft yarns in the undulated condition. This invention also includes methods for making such fabric by increasing the thickness of a woven or non-woven material by such methods as applying tension to warp yarns having opposite twists during weaving operations, or using unbalanced yarns, for example.

17 Claims, 3 Drawing Sheets

U.S. PATENT DOCUMENTS

| | | | |
|---|---|---|---|
| 3,135,069 A | 6/1964 | Schuller et al. |
| 3,204,379 A | 9/1965 | Osborn |
| 3,284,980 A | 11/1966 | Dinkel |
| 3,754,362 A | 8/1973 | Daimler et al. |
| 4,015,302 A | 4/1977 | Clark |
| 4,019,326 A | 4/1977 | Herveling et al. |
| 4,024,719 A | 5/1977 | Risseeuw |
| 4,062,160 A | 12/1977 | Christison |
| 4,087,191 A | 5/1978 | Brady et al. |
| 4,107,372 A | 8/1978 | Clausen et al. |
| 4,111,582 A | 9/1978 | Tippett |
| 4,253,288 A | 3/1981 | Chun |
| 4,298,413 A | 11/1981 | Teare |
| 4,315,392 A | 2/1982 | Sylvest |
| 4,329,392 A | 5/1982 | Bronner |
| 4,351,867 A | 9/1982 | Mulvey et al. |
| 4,450,022 A | 5/1984 | Galer |
| 4,472,086 A | 9/1984 | Leach |
| 4,488,909 A | 12/1984 | Galer et al. |
| 4,518,652 A | 5/1985 | Willoughby |
| 4,578,915 A | 4/1986 | Schneller |
| 4,668,547 A | 5/1987 | Brouessard |
| 4,669,246 A | 6/1987 | Freeman |
| 4,689,258 A | 8/1987 | Slosberg et al. |
| 4,699,542 A | 10/1987 | Shoesmith |
| 4,805,367 A | 2/1989 | Kleckner |
| 4,810,569 A | 3/1989 | Lehnert et al. |
| 4,810,573 A | 3/1989 | Harriett |
| 4,815,963 A | 3/1989 | Berkhout |
| 4,840,515 A | 6/1989 | Freese |
| 4,851,277 A | 7/1989 | Valkenburg et al. |
| 4,876,151 A | 10/1989 | Eichen |
| 4,916,004 A | 4/1990 | Ensminger et al. |
| 4,942,699 A | 7/1990 | Spinelli |
| 4,943,185 A | 7/1990 | McGuckin et al. |
| 4,946,310 A | 8/1990 | Wunderatzke |
| 4,957,390 A | 9/1990 | Shoesmith |
| 5,019,195 A | 5/1991 | Skinner |
| 5,030,502 A | 7/1991 | Teare |
| 5,081,814 A | 1/1992 | Singletary et al. |
| 5,099,627 A | 3/1992 | Coulton et al. |
| 5,110,627 A | 5/1992 | Shoesmith et al. |
| 5,143,757 A | 9/1992 | Skinner |
| 5,218,798 A | 6/1993 | Bentivegna et al. |
| 5,230,189 A | 7/1993 | Sourlis |
| 5,230,192 A | 7/1993 | Webb et al. |
| 5,238,450 A | 8/1993 | Rotter |
| 5,246,306 A | 9/1993 | Shoesmith et al. |
| 5,287,673 A | 2/1994 | Kreikemeier |
| 5,308,692 A | 5/1994 | Kennedy et al. |
| 5,371,989 A | 12/1994 | Lehnert et al. |
| 5,393,559 A | 2/1995 | Shoesmith et al. |
| 5,410,852 A | 5/1995 | Edgar et al. |
| 5,456,785 A | 10/1995 | Venable |
| 5,476,340 A | 12/1995 | Contrasto |
| 5,481,843 A | 1/1996 | Kreikemeier |
| 5,573,844 A | 11/1996 | Donovan et al. |
| 5,598,673 A | 2/1997 | Atkins |
| 5,697,195 A | 12/1997 | Maylon |
| 5,704,179 A | 1/1998 | Lehnert et al. |
| 5,826,388 A | 10/1998 | Irving |
| 5,836,715 A | 11/1998 | Hendrix et al. |
| 5,960,595 A | 10/1999 | McCorsley, III et al. |
| 6,054,205 A | 4/2000 | Newman et al. |
| 6,131,353 A | 10/2000 | Egan |
| 6,192,650 B1 | 2/2001 | Kittson et al. |
| 6,235,126 B1 | 5/2001 | Kittson et al. |
| 6,235,136 B1 | 5/2001 | Kittson et al. |
| 6,296,912 B1 | 10/2001 | Zickell |
| 6,355,333 B1 | 3/2002 | Waggoner et al. |
| 6,360,780 B1 | 3/2002 | Adolphs et al. |
| 6,615,875 B2 | 9/2003 | Adolphs et al. |
| 6,666,618 B1 | 12/2003 | Anaya et al. |
| 7,435,694 B2 | 10/2008 | Kajander |
| 2003/0086762 A1 | 5/2003 | Oka et al. |
| 2004/0074184 A1 | 4/2004 | Naji |
| 2005/0009428 A1* | 1/2005 | Porter et al. ............... 442/129 |

FOREIGN PATENT DOCUMENTS

| | | |
|---|---|---|
| DE | DIN 18 180 | 8/1978 |
| DE | 4137310 | 5/1992 |
| DE | 4311357 | 10/1994 |
| DE | 4431976 | 3/1995 |
| EP | 0 051 101 | 10/1986 |
| EP | 526848 | 2/1993 |
| EP | 0 957 203 A2 | 11/1999 |
| EP | 1 239 080 A1 | 9/2002 |
| FR | 893.027 | 10/1982 |
| GB | 2 119 703 A | 11/1983 |
| JP | 43-24549 | 10/1968 |
| JP | 57-129737 | 8/1982 |
| JP | 3-244928 | 11/1991 |
| JP | 05-009902 | 1/1993 |
| JP | 5-33522 | 8/1993 |
| JP | 09-177014 | 7/1997 |
| JP | 10-509777 | 9/1998 |
| JP | 11-323812 | 11/1999 |
| NL | 7707355 | 1/1979 |
| WO | WO 8904897 | 6/1989 |
| WO | WO 9914442 | 3/1999 |
| WO | WO 9929978 | 6/1999 |
| WO | WO 00/37726 | 6/2000 |
| WO | WO 01/44579 | 6/2001 |

OTHER PUBLICATIONS

Saint-Gobain Vetrotex Twintex Material Safety Data Sheet, 15 pages, 2003.
Saint-Gobain Vetrotex Twintex Glass/PP Fabrics, 2 pages, 2001.
Saint-Gobain Vetrotex Twintex Glass/PP Roving, 2 pages, 2001.
Saint-Gobain Vetrotex Twintex Glass/PP Plates, 2 pages, 2001.
Warren et al., Decision on Appeal No. 2003-1901, Mar. 9, 2004, pp. 1-10. US Patent and Trademark Office.
U.S. Patent Application "An Exterior Finishing System and Building Wall Containing a Corrosion-Resistant Enhanced Thickness Fabric and Method of Constructing Same" filed Dec. 19, 2003.
Georgia Lathing & Plastering Contractors Association, 2002, pp. 1-4.
Stucco Solutions, Sanjon Corp., Jan. 2, 2003, pp. 1-2.
Amico, Metal Lath and Accessories, Trade literature, pp. 1-8.
Acceptance Criteria for Cementitious Exterior Wall Coatings, Trade literature, Sep. 2002, pp. 1-8.
ES Legacy Report No. NER-676, Trade literature, Jul. 1, 2003, pp. 1-9.
ES Report No. ER-5987, Plaster Reinforcement, Feb. 1, 2022, 1 page.
Weber, Ron, "Top Quality Three-Coat Stucco", Jan. 2003, pp. 1-4.
Sto RainScreen II, Short Form Specification A 800, Jan. 2003, pp. 1-3.
"Building Permit Will Specify Material, Methods", Remodelers Council, Albuquerque Journal, 2002, pp. 1-3.
Dryvit Drainage Mat, Dryvit Systems Inc., Jun. 20, 2001, pp. 1-2.
AP Foil-Faced Polyisocyanurate Foam Sheathing, Johns Manville, 2002, pp. 1-3.
Synthetic Stucco-EIFS, Pillar to Post, 1999, pp. 1-2.
ICBO Evaluation Service, Inc., Evaluation Report: Exterior Insulation and Finish Systems, Oct. 1, 2000, pp. 1-5.
ICBO Evaluation Service, Inc., Evaluation Report: Exterior Coatings, Sep. 1, 1998, pp. 1-7.
Eternit, Trade literature, 2 pages.
Eternit Trade literature, Architectural Roofing Slates, Fiber Reinforced Cement Shingles, pp. 1-4 1989.
Eternit Trade literature, Eternit Slates, 1989, pp. 1-7.
Eternit Trade literature, Qatra Exterior Wall System, 1989, pp. 1-4.
Eternit Trade literature, Eterspan®, a Fiber Reinforced Cement Panel, 1988, pp. 1-8.

Eternit Trade literature, Glasweld, Architectural Building Panel, 1989, pp. 1-8.

Eternit Trade literature, Eterboard®, High Performance, Asbestos Free, Fiber Reinforced Cement Panel, 1988, pp. 1-4.

Eternit Trade literature, Eflex®, High Performance, Asbestos Free, Fiber Reinforced Cement Panel, 1988, pp. 1-4.

Eternit Trade literature, Profile 3, 3 inch Corrugated Lightweight Fiber Reinforced Cement Sheets, pp. 1-2.

Eternit Trade literature, Profile 4.2, 4.2 inch corrugated fiber reinforced cement sheets, 1990. pp. 1-2.

Eternit Trade literature, Profile 6, Corrugated Roofing and Siding, 1989, pp. 1-4.

Eternit Trade literature, Facad, Sculptured Architectural Panels, Jan. 1989, pp. 1-4.

Eternit Trade literature, Substrate "500", Ceramic Tile Backer Board, 1989, pp. 1-6.

Eternit Trade literature, Substrate "500", Cement Backer Board for Ceramic Tile—Lifetime Performance, 1990, pp. 1-6.

Eternit Trade literature, Worldwide Manufacturing, pp. 1-2.

FiberLath, Building components for the new millennium, trade literature, Jul. 14, 2004, 2 pages.

* cited by examiner

ENHANCED THICKNESS FABRIC AND METHOD OF MAKING SAME

CROSS-REFERENCE TO RELATED APPLICATIONS

The present invention is a Continuation-In-Part of U.S. Ser. No. 10/742,087, filed Dec. 19, 2003 (D1815-00077).

FIELD OF THE INVENTION

The present invention relates to fabrics useful as reinforcements, and especially, fabric manufacturing methods for manipulating fibers to achieve selected properties.

BACKGROUND OF THE INVENTION

A composite material can be defined as a macroscopic combination of two or more distinct materials, having a recognizable interface between them. Because composites are usually used for their structural properties, they often refer to materials that contain a reinforcement, such as fibers or particles, supported by a binder or matrix material. The discontinuous fibers or particles are generally stiffer and stronger than the continuous matrix phase, which can be a polymer, mastic, or hydraulic setting material, for example.

Fiber reinforced composites can be further divided into those containing discontinuous or continuous fibers. There is a tremendous potential advantage in strength-to-weight and stiffness-to-weight ratios of fiber reinforced composites over conventional materials. Their desirable properties can be obtained when the fibers are embedded in a matrix that binds them together, transfers the load to and between the fibers, and protects the fibers from environments and handling.

Glass fiber reinforced organic matrix composites are the most familiar and widely used, and have had extensive application in industrial, consumer, and military markets. Carbon fiber reinforced resin matrix composites are, by far, the most commonly applied advanced composites for a number of reasons. They offer extremely high specific properties, high quality materials that are readily available, reproducible material forms, increasing favorable cost projections, and comparative ease of manufacturing. Composites reinforced with aramid, other organics, and boron fibers, and with silicon-carbide, alumina, and other ceramic fibers, are also used.

Once continuous high strength fibers have been produced, they are usually converted into a form suitable for their intended composite application. The major finished forms are continuous roving, woven roving, fiberglass mat, chopped strand, and yarns for textile applications. Woven roving is produced by weaving fiberglass or carbon rovings, for example, into a fabric form. This yields a coarse product that may be used in many hand lay-up and panel molding processes to produce fiber reinforced plastics, mastics, roofing materials, and hydraulic setting boards. Many weave configurations are available, depending upon the requirements of the composite. Plain or twill weaves provide strength in both directions, while a unidirectionally stitched or knitted fabric provides strength primarily in one dimension. Many novel fabrics are currently available, including biaxial, double bias and triaxial weaves for special applications.

Fiber glass yarns are typically converted to fabric form by conventional weaving operations. Looms of various kinds are used in the industry, but the air-jet loom is the most popular. The major characteristics of a fabric include its style or weave pattern, fabric count, and the construction of warp yarns and fill yarns. Together, these characteristics determine fabric properties, such as drapability and performance in the final composite. The fabric count identifies the number of warp and fill yarns per inch. Warp yarns run parallel to the machine direction, and fill yarns are perpendicular.

Texturizing is a process in which the textile yarn is subject to an air-jet that impinges on its surface to make the yarn "fluffy". The air-jet causes the surface filaments to break at random, giving the yarn a bulkier appearance. Carding is a process that makes staple fiber glass yarn from continuous yarn. Texturized or carded yarn absorbs much more resin or other matrix material, than unmodified yarn, and increases the resin-to-glass ratio in the final composite. Aramid and glass fibers are also known to be processed into needle-punched felts, which additionally, improves the resin absorption and/or fluffiness of the fabric.

While needling, texturizing, and carding have provided improved properties and more interesting dimensional characteristics for fabric, there remains a present need for manipulating yarns in a fabric to achieve even greater fabric thicknesses.

SUMMARY OF THE INVENTION

In a first embodiment of this invention, a fabric is provided including an open woven layer, including interwoven warp and weft yarns, wherein at least a pair of adjacent ones of said warp yarns are mechanically manipulated to at least partially untwist said adjacent warp yarns whereby a weft yarn disposed between said adjacent warp yarn forms a curved sinusoidal path having a generally "C" shaped configuration, bridging said adjacent warp yarns and increasing the fabrics thickness. These manipulated yarns are treated and fixed with a polymeric coating so as to retain this increased thickness.

In a further embodiment of the present invention, a corrosion resistant fabric for use as a reinforcement in a matrix is provided. The fabric includes an open, woven, braided, scrim type or knitted fabric comprising high strength, non-metallic, weft and warp yarns, whereby a portion of the weft yarns are mechanically manipulated to form a generally "C" shaped bridge between adjacent warp yarns, said bridge increasing the fabric's thickness by at least about 50%, and a bonding agent for retaining the weft and warp yarns in a relatively fixed position.

In a still further embodiment of this invention, a matrix reinforcement is provided which includes an open, woven fabric comprising weft and warp yarns in which a portion of the weft yarns are undulated into a curved sinusoidal path having inflexion points located substantially only at intersection points with said warp yarns, resulting in an increased thickness for said fabric. The fabric is then coated with a polymeric resin for substantially binding the weft yarns in said undulated condition.

This invention also provides a method of making a fabric having increased thickness which includes the steps of providing a scrim type, braided, woven, or knitted fabric, comprising weft and warp yarns containing glass fibers, adjacent ones of said warp yarns having oppositely disposed twists; applying a tensile force to said warp yarns, whereby a portion of said weft yarns becomes undulated in a generally "C" shaped configuration between adjacent warp yarns, resulting in an increased thickness for said fabric; and bonding said fabric with a bonding agent whereby said undulated weft yarns become substantially fixed.

The present invention provides woven, knit, braided, and/or scrim-like constructions which are, preferably, fairly "open", having hole sizes greater than about 1 mm, and preferably, about 0.02 to more than 4.0 square inches. Such an open construction allows matrix material to easily penetrate the fabric and encapsulate the fibers. The present invention provides significantly enhanced thickness versus typical high performance fabric reinforcements of similar construction. Such thicknesses have been difficult to achieve in a cost effective way by normal means of fabric formation. The fabric should be able to withstand six (6) pounds per square foot of matrix loading without significant deformation.

In a preferred process for this invention, a woven, knitted, braided, or scrim-like fabric comprising weft and warp yarns containing glass fibers is provided. A tensile force is applied to the warp yarns, whereby a portion of the weft yarns becomes undulated, resulting in an increased thickness for the fabric. The fabric is then bound together with a bonding agent, such as a polymeric resin, whereby the undulated weft yarns become substantially fixed. By exploiting certain constructions, such as a "leno weave", and by coating and drying the product in situ, such as on a tenter frame, whereby the width of the fabric can be controlled, a fabric of much greater thickness can be produced in a controlled and repeatable way.

Using a leno weave fabric as an example, this invention takes advantage of the construction of weft yarns inserted through the twisted warp yarns at regular intervals, and which are locked in place. When tension is applied to the warp yarns, they are inclined to untwist themselves, creating a torque effect on the weft yarns. As each warp yarn untwists, the combined torque effect creates a weft yarn that assumes a generally sinusoidal profile or "S" shape or version when viewed in the plane of the fabric. As later explained, the sinusoidal profile can be converted to a generally "C" shape or version by twisting adjacent warp yarns in different directions before weaving, for example. The thickness of the fabric thus increases about 0.5 to 100 fold at the cost of a small loss in the width of the fabric.

It has been found that for this thickness increase and width to be enhanced, controlled and reproducible, it is preferred that the product be coated and dried on the fabric making equipment, and held in position, such as by a tenter frame or by the use of tenter frame with "clips". The tenter frame functions to apply the necessary tension to the warp yarns of the fabric to induce the torque effect. The clips hold the edges of the fabric as it runs through the coating line and drying oven, and they are adjustable to add or subtract width, as needed. Applying high tension and allowing the width of the fabric to decrease, via the clips, can, in the preferred embodiment, increase the thickness of the fabric via the torque effect of the warp yarns. The manufacture of the thickened fabric is not limited to tenter frames equipped with clips. "Clipless" drying systems can be used with slightly more variation in dimensional stability.

Coating selection is important for the purposes of this invention. In order for the weft yarns to hold their sinusoidal shape, the coating must be somewhat rigid and resist softening in matrix materials, although it is envisioned that the matrix material and the coating can be the same or different materials. Suitable polymers include styrene/butadiene and styrene acrylate polymers of high styrene content. E and A/R glass are preferred fibers for the fabrics.

This invention involves an alternative way of drawing the machine direction yarns into the loom such that a greater and more consistent thickness is achieved with the same amount of yarn in the weft or cross direction. The new entry method is colloquially described as the "C" configuration, as opposed to the initial "S" configuration. This refers to the shape that the weft yarn assumes when viewed down the plane of the fabric and between two warp yarns.

Embodiments of the present invention involve the way that the machine direction yarns (also known as warp yarns) in each leno group are drawn into the loom. If each leno group is drawn into the loom in the same manner, such that each leno group twists in the same direction, the weft yarn assumes the shape of an "S". In other words, the weft yarn, as viewed in the plane of the fabric and between two adjacent warp yarns, forms an "S" shape. There is an inflection point in the weft yarn between the two warp groups.

If the warp yarns are drawn into the loom such that each leno group has an alternating direction of twist, then the weft yarn assumes a "C" shape when viewed in the plane of the fabric between two warp groups. This "C" configuration has proven to be more efficient in achieving the increased thickness. First, less yarn is needed in the weft direction to achieve a given thickness than with the "S" configuration since the yarn travels a more direct route between warp groups. Also, experience in producing the "C" fabric has shown that the thickness is very constant across the width of the web. With the "S" configuration, there was a significant variation in fabric thickness across the width, and this variation was difficult to remove during processing on the coater. The thickness generally increased from one side of the fabric to the other in a gradual way.

One purpose of the fabric of this invention is to act as a substrate for stucco, which is typically spray applied in exterior building finishing systems. The fabric serves to prevent the stucco from "sloughing" or sagging until it has set into a solid material. To perform such a function the fabric, desirably is embedded within the stucco. The present invention would eliminate the rusting and subsequent discoloration problem inherent in steel mesh installations. Handling and cutting an open woven glass or polymeric fabric would be much easier than steel, and the risk of damage to skin by sharp wire is eliminated.

BRIEF DESCRIPTION OF THE DRAWINGS

The accompanying drawings illustrate preferred embodiments of the invention, as well as other information pertinent to the disclosure, in which.

DETAILED DESCRIPTION OF THE INVENTION

Figure 1:
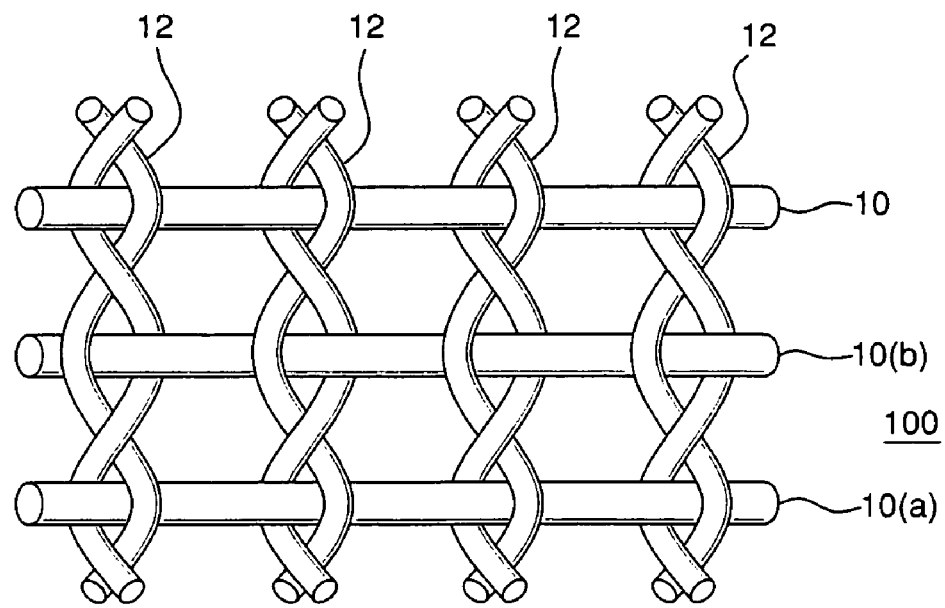
FIG. 1 is a top plan view of a fabric of this invention prior to fiber manipulation.

This invention provides fabric constructions useful in many end-use applications, including: polymer matrix composites, soil reinforcement, road, asphalt and mastic reinforcement, cement and gypsum boards, roof and tile underlayment (boards and poured-in-place), drainage mats or systems, roofing membrane and shingles, medical applications such as fiberglass casts, bandages, orthopedic applications, etc., and textile and carpet applications. In such applications, the fabric can be embedded or applied to contact a surface of a matrix, or both.

DEFINED TERMS

Composite facing material. Two or more layers of the same or different materials including two or more layers of fabrics, cloth, knits, mats, wovens, non-wovens and/or scrims, for example.

Fabric. Woven or non-woven flexible materials, such as tissues, cloths, knits, weaves, carded tissue, spun-bonded and point-bonded non-wovens, needled or braided materials.

Fiber. A general term used to refer to filamentary materials. Often, fiber is used synonymously with filament. It is generally accepted that a filament routinely has a finite length that is at least 100 times its diameter. In most cases, it is prepared by drawing from a molten bath, spinning, or by deposition on a substrate.

Filament. The smallest unit of a fibrous material. The basic units formed during drawing and spinning, which are gathered into strands of fiber for use in composites. Filaments usually are of extreme length and very small diameter. Some textile filaments can function as a yarn when they are of sufficient strength and flexibility.

Glass. An inorganic product of fusion that has cooled to a rigid condition without crystallizing. Glass is typically hard and relatively brittle, and has a conchoidal fracture.

Glass cloth. An oriented fabric which can be woven, knitted, needled, or braided glass fiber material, for example.

Glass fiber. A fiber spun from an inorganic product of fusion that has cooled to a rigid condition without crystallizing.

Glass Filament. A form of glass that has been drawn to a small diameter and long lengths.

Knitted fabrics. Fabrics produced by interlooping chains of filaments, roving or yarn.

Mat. A fibrous material consisting of randomly oriented chopped filaments, short fibers, or swirled filaments loosely held together with a binder.

Roving. A number of yarns, strands, tows, or ends collected into a parallel bundle with little or no twist.

Tensile strength. The maximum load or force per unit cross-sectional area, within the gage length, of the specimen. The pulling stress required to break a given specimen. (See ASTM D579 and D3039)

Tex. Linear density (or gauge) of a fiber expressed in grams per 1000 meters.

Textile fibers. Fibers or filaments that can be processed into yarn or made into a fabric by interlacing in a variety of methods, including weaving, knitting, and braiding.

Viscosity. The property of resistance to flow exhibited within the body of a material, expressed in terms of the relationship between applied shearing stress and resulting rate of strain in shear. Viscosity is usually taken to mean Newtonian viscosity, in which case the ratio of sheathing stress to the rate of shearing strain is constant. In non-Newtonian behavior, the ratio varies with the shearing stress. Such ratios are often called the apparent viscosities at the corresponding shearing stresses. Viscosity is measured in terms of flow in Pa's (P), with water as the base standard (value of 1.0). The higher the number, the less flow.

Warp. The yarn, fiber, or roving running lengthwise in a woven fabric. A group of yarns, fibers, or roving in long lengths and approximately parallel.

Weave. The particular manner in which a fabric is formed by interlacing yarns, fibers or roving. Usually assigned a style number.

Weft. The transverse threads or fibers in a woven fabric. Those fibers running perpendicular to the warp. Also called fill, filling yarn or woof.

Woven fabric. A material (usually a planar structure) constructed by interlacing yarns, fibers, roving or filaments, to form such fabric patterns, such as plain, harness satin, or leno weaves.

Woven roving. A heavy glass fiber fabric made by weaving roving or yarn bundles.

Yarn. An assemblage of twisted filaments, fibers, or strands, either natural or manufactured, to form a continuous length that is suitable for use in weaving or interweaving into textile materials.

Zero-twist-yarn. A lightweight roving, i.e., a strand of near zero twist with linear densities and filament diameters typical of fiberglass yarn (but substantially without twist).

DETAILED DESCRIPTION OF THE INVENTION

With reference to the Figures, and particularly to FIGS. 1-5 thereof, there is depicted a fabric 101. Needled, woven, knitted, and composite materials are preferred because of their impressive strength-to-weight ratio and, in the case of wovens and knits, their ability to form weft and warp yarn patterns which can be manipulated into the thickened fabric structures of this invention. A thickened fabric is produced which includes an open-woven layer comprising high-strength non-metallic weft and warp yarns, whereby a portion of the yarns are mechanically manipulated to increase the fabric's thickness by at least about 50%. In further embodiments of this invention, a leno weave fabric consisting of warp (machine direction yarns), twisted around weft yarns (cross-machine direction yarns) twist around one another. Weft yarns are inserted through the twisted warp yarns at regular intervals and are locked in place. When tension is applied to the warp yarns they are inclined to untwist themselves, thus creating a torque effect on the weft yarns. As each warp yarn untwists, the combined torque effect creates a weft yarn that assumes a sinusoidal profile when viewed in the plane of the fabric. The thickness of the fabric thus increases, with only a small loss in the width of the fabric. Such a "thickening" effect can also be produced with an "unbalanced" fabric construction, such as when the combined weight of the warp yarns is greater than the combined weight of the weft yarns, so the ability of the weft yarns to resist deformation due to torque is reduced. Another way to accomplish thickening is to use heavier warp yarn, and less of them in the warp direction. This creates greater tension per warp yard and a wider span of weft yarn for the tensile force to act upon. The result is an increased torque effect, also under normal manufacturing conditions, with an accompanying increase in fabric thickness. While the fabric of this invention can contain fibers and filaments of organic and inorganic materials, such as glass, olefins, such as polyethylene or polystyrene, polypropylene, Kevlar®, graphite, rayon, polyester, carbon, ceramic fibers, or combinations thereof, such as glass polyester blends or Twintex® glass-olefin (polypropylene or polyethylene) composite, available from Companie de Saint-Gobain, France. Of these types of fibers and filaments, glass compositions are the most desirable for their fire resistance, low cost and high mechanical strength properties.

Glass Composition

Although a number of glass compositions have been developed, only a few are used commercially to create continuous glass fibers. The four main glasses used are high alkali-resistant (AR-glass), electrical grade (E-glass), a modified E-glass that is chemically resistant (ECR-glass), and high strength (S-glass). The representative chemical compositions of these four glasses are given in Table 1 are dried and transferred to the specific fabrication area for conversion into the finished fiberglass roving, mat, chopped strand, or other product. In recent years, processes have been developed to produce finished roving or chopped products

TABLE 1

Glass composition

Material, wt %

| Glass type | Silica | Alumina | Calcium oxide | Magnesia | Boric oxide | Soda | Calcium fluoride | Zirconium Oxide | Total minor oxides |
|---|---|---|---|---|---|---|---|---|---|
| E-glass | 54 | 14 | 20.5 | 0.5 | 8 | 1 | 1 | — | 1 |
| A-glass | 72 | 1 | 8 | 4 | — | 14 | — | — | 1 |
| ECR-glass | 61 | 11 | 22 | 3 | — | 0.6 | — | — | 2.4 |
| S-glass | 64 | 25 | — | 10 | — | 0.3 | — | — | 0.7 |
| AR-glass | 62 | .8 | 5.6 | — | — | 14.8 | — | 16.7 | 0.1 |

(Chem-FIL ®)

The inherent properties of the four glass fibers having these compositions are given in Table 2.

directly during forming, thus leading to the term direct draw roving or direct chopped strand.

TABLE 2

Inherent properties of glass fibers

| | Specific gravity | Tensile strength | | Tensile modulus | | Coefficient of thermal expansion, $10^{-6}/K$ | Dielectric constant(a) | Liquidus temperature | |
|---|---|---|---|---|---|---|---|---|---|
| | | MPa | Ksi | GPa | $10^6$ psi | | | C. ° | F. ° |
| E-glass | 2.58 | 3450 | 500 | 72.5 | 10.5 | 5.0 | 6.3 | 1065 | 1950 |
| A-glass | 2.50 | 3040 | 440 | 69.0 | 10.0 | 8.6 | 6.9 | 996 | 1825 |
| ECR-glass | 2.62 | 3625 | 525 | 72.5 | 10.5 | 5.0 | 6.5 | 1204 | 2200 |
| S-glass | 2.48 | 4590 | 665 | 86.0 | 12.5 | 5.6 | 5.1 | 1454 | 2650 |

(a)At 20° C. (72° F.) and 1 MHZ. Source: Ref 4

Glass Melting and Forming

The conversion of molten glass in the forehearth into continuous glass fibers is basically an attenuation process. The molten glass flows through a platinum-rhodium alloy bushing with a large number of holes or tips (400 to 8000, in typical production). The bushing is heated electrically, and the heat is controlled very precisely to maintain a constant glass viscosity. The fibers are drawn down and cooled rapidly as they exit the bushing. A sizing is then applied to the surface of the fibers by passing them over an applicator that continually rotates through the sizing bath to maintain a thin film through which the glass filaments pass. After the sizing is applied, the filaments are gathered into a strand before approaching the take-up device. If smaller bundles of filaments (split strands) are required, multiple gathering devices (often called shoes) are used.

The attenuation rate, and therefore the final filament diameter, is controlled by the take-up device. Fiber diameter is also impacted by bushing temperature, glass viscosity, and the pressure head over the bushing. The most widely used take-up device is the forming winder, which employs a rotating collet and a traverse mechanism to distribute the strand in a random manner as the forming package grows in diameter. This facilitates strand removal from the package in subsequent processing steps, such as roving or chopping. The forming packages Fabrication Process Once the continuous glass fibers have been produced they must be converted into a suitable form for their intended application. The major finished forms are continuous roving, woven roving, fiberglass mat, chopped strand, and yarns for textile applications. Yarns are used in many applications of this invention.

Fiberglass roving is produced by collecting a bundle of strands into a single large strand, which is wound into a stable, cylindrical package. This is called a multi-end roving process. The process begins by placing a number of oven-dried forming packages into a creel. The ends are then gathered together under tension and collected on a precision roving winder that has constant traverse-to-winding ratio, called the waywind.

Rovings are used in many applications of this invention. Woven roving is produced by weaving fiberglass roving into a fabric form. This yields a coarse product. The course surface is ideal for polymer matrix composites, cement board, road patch, soil reinforcement, and adhesive applications, since these materials can bind to the coarse fibers easily. Plain or twill weaves are less rough, thereby being easier to handle without protective gloves, but will absorb matrices and adhesive. They also provide strength in both directions, while a unidirectionally stitched or knitted fabric provides strength primarily in one dimension. Many novel fabrics are currently available, including biaxial, double bias, and triaxial weaves for special applications.

Combinations of fiberglass mat, scrim, chopped fibers and woven or knit filaments or roving can also be used for the preferred reinforcing thickened fabric constructions. The appropriate weights of fiberglass mat (usually chopped-strand mat) and woven roving filaments or loose chopped fibers are either bound together with a chemical binder or mechanically knit, needled, felted, or stitched together. One such combination would be a fiberglass and/or resin fiber mat or scrim layered with chopped glass or resin fibers and then needled, felted or stitched together.

The yarns of the facing layers of this invention can be made by conventional means. Fine-fiber strands of yarn from the forming operation can be air dried on forming tubes to provide sufficient integrity to undergo a twisting operation. Twist provides additional integrity to yarn before it is subjected to the weaving process, a typical twist consisting of up to one turn per inch. In many instances heavier yarns are needed for the weaving operation. This is normally accomplished by twisting together two or more single strands, followed by a plying operation. Plying essentially involves retwisting the twisted strands in the opposite direction from the original twist. The two types of twist normally used are known as S and Z, which indicate the direction in which the twisting is done. Usually, two or more strands twisted together with an S twist are plied with a Z twist in order to give a balanced yarn. Thus, the yarn properties, such as strength, bundle diameter, and yield, can be manipulated by the twisting and plying operations. Fiberglass yarns are converted to fabric form by conventional weaving operations. Looms of various kinds are used in the industry, but the air jet loom is the most popular.

Zero twist-yarns may also be used. This input can offer the ease of spreading of (twistless) roving with the coverage of fine-filament yarns. The number of filaments per strand used directly affect the porosity and are related to yarn weight as follows: $n=(490 \times Tex)/d^2$, where "d" is the individual filament diameter expressed in microns. Thus, if the roving with coarse filaments can be replaced with near zero twist yarn with filaments half the diameter, then the number of filaments increases by a factor of 4 at the same strand Tex.

The major characteristics of the woven embodiments of this invention include its style or weave pattern, fabric count, and the construction of warp yarn and fill yarn. Together, these characteristics determine fabric properties such as drapability. The fabric count identifies the number of warp and fill or weft yarns per inch. Warp yarns run parallel to the machine direction, and weft yarns are perpendicular.

There are basically four weave patterns: plain, basket, twill, and satin. Plain weave is the simplest form, in which one warp yarn interlaces over and under one fill yarn. Basket weave has two or more warp yarns interlacing over and under two or more fill yarns. Twill weave has one or more warp yarns over at least two fill yarns. Satin weave (crowfoot) consists of one warp yarn interfacing over three and under one fill yarn, to give an irregular pattern in the fabric. The eight harness satin weave is a special case, in which one warp yarn interlaces over seven and under one fill yarn to give an irregular pattern. In fabricating a board, the satin weave gives the best conformity to complex contours, such as around corners, followed in descending order by twill, basket, and plain weaves.

Texturizing is a process in which the textile yarn is subjected to an air jet that impinges on its surface to make the yarn "fluffy". The air jet causes the surface filaments to break at random, giving the yarn a bulkier appearance. The extent to which this occurs can be controlled by the velocity of the air jet and the yarn feed rate. An equivalent effect can be produced by electrostatic or mechanical manipulation of the fibers, yarns or roving.

Fabric Design

The fabric pattern, often called the construction, is an x, y coordinate system. The y-axis represents warp yarns and is the long axis of the fabric roll (typically 30 to 150 m, or 100 to 500 ft.). The x-axis is the fill direction, that is, the roll width (typically 910 to 3050 mm, or 36 to 120 in.). Basic fabrics are few in number, but combinations of different types and sizes of yarns with different warp/fill counts allow for hundreds of variations.

Basic fabric structures include those made by woven, non-woven, and knit processes. In this invention, one preferred design is a knit structure in which both the x axis strands and the y axis strands are held together with a third strand or knitting yarn. This type of knitting is weft-inserted-warp knitting. If an unshifted tricot stitch is used, the x and y axis strands are the least compressed and, therefore, give the best coverage at a given areal weight. This structure's coverage can be further increased, i.e., further reduction in porosity, by using near-zero-twist-yarn or roving which, naturally, spreads more than tightly twisted yarn. This design can be further improved by assisting the spreading of filaments by mechanical (needling) means, or by high-speed air dispersion of the filaments before or after fabric formation.

The most common weave construction used for everything from cotton shirts to fiberglass stadium canopies is the plain weave. The essential construction requires only four weaving yarns: two warp and two fill. This basic unit is called the pattern repeat. Plain weave, which is the most highly interlaced, is therefore the tightest of the basic fabric designs and most resistant to in-plane shear movement. Basket weave, a variation of plain weave, has warp and fill yarns that are paired: two up and two down. The satin weave represent a family of constructions with a minimum of interlacing. In these, the weft yarns periodically skip, or float, over several warp yarns. The satin weave repeat is x yarns long and the float length is x−1 yarns; that is, there is only one interlacing point per pattern repeat per yarn. The floating yarns that are not being woven into the fabric create considerable looseness or suppleness. The satin weave produces a construction with low resistance to shear distortion and is thus easily molded (draped) over common compound curves. Satin weaves can be produced as standard four-, five-, or eight-harness forms. As the number of harnesses increases, so do the float lengths and the degree of looseness making the fabric more difficult to control during handling operations. Textile fabrics generally exhibit greater tensile strength in plain weaves, but greater tear strength in satin weaves. The higher the yarn interlacing (for a given-size yarn), the fewer the number of yarns that can be woven per unit length. The necessary separation between yarns reduces the number that can be packed together. This is the reason for the higher yarn count (yarns/in.) that is possible in unidirectional material and its better physical properties.

A plain weave having glass weft and warp yarns or roving, in a weave construction is known as locking leno. The gripping action of the intertwining leno yarns anchors or locks the open selvage edges produced on rapier looms. The leno weave helps prevent selvage unraveling during subsequent handling operations. However, it is also valuable where a very open (but stable) weave is desired.

Figure 2:
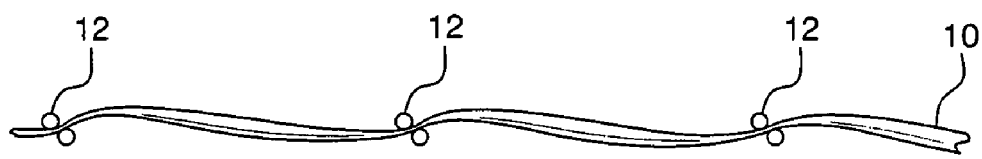
FIG. 2 is a front plan view of the fabric of FIG. 1.

The preferred "leno weave" fabric 100 of this invention consists of weft yarns 10 and warp yarns 12. The weft yarns 10 are oriented in the cross-machine direction and the warp yarns 12 are oriented in the machine direction 10. As shown in FIGS. 1 and 2, the weft yarns 10 and warp yarns 12 are twisted around one another at regular intervals and are locked in place. Preferably, the spacing between yarns is fairly open with hole sizes ranging in area from 0.02 to more than 4.0 square inches (0.5-102 mm$^2$). The leno weave 100 can be converted into a "thickened" fabric 101.

Figure 3:
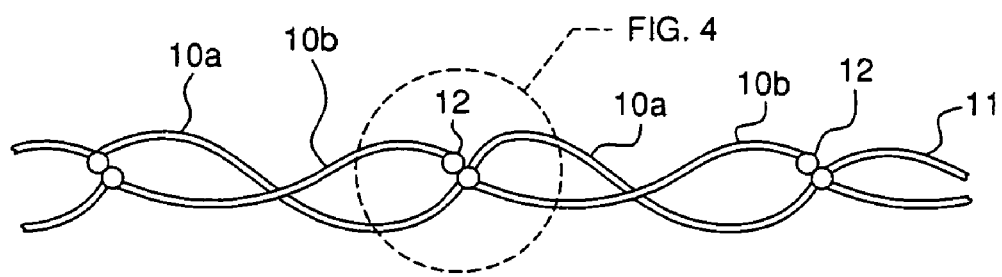
FIG. 3 is a front plan view of the fabric of FIG. 1 after manipulation of the fibers to increase fabric thickness.

One of the important features of the present invention is demonstrated in FIG. 3 in which alternate weft yarns 10A and 10B are shown assuming a generally sinusoidal profile when viewed in the plain of the fabric, and more preferably, the weft yarns alternate between sinusoidal profiles having at least two different orientations represented by weft yarns 10A and 10B, for example. Preferably, the thickened fabric has an enhanced thickness of at least about 1 mm, preferably greater than 10 mm, and in some cases, greater than 500 mm. Experience has proven that such thicknesses are rarely achievable in a cost effective way utilizing glass yarns employing the normal means of fabric formation. By exploiting the nature of specific weave constructions, such as a leno weave, and by coating and drying the product on a tenter frame, whereby the width of the fabric can be controlled, the preferred thickened fabric 101 or thickened fabric structure 30 can be produced in a controlled and repeatable way.

In a first embodiment of producing a thickened fabric 101 of this invention, the warp yarns of the leno weave 100 are subjected to a tensile force. The warp yarns 12 then begin to untwist themselves, creating a torque effect on the weft yarns 10A and 10B, for example. As each warp yarn 12 untwists, the combined torque effect creates a weft yarn 10A or 10B that assumes a sinusoidal profile when viewed in the plane of the fabric. See FIG. 3. The thickness of the fabric as measured from the high point and low point of the sinusoidal profiles of weft yarns 10A and 10B thus increases with a slight loss in the width of the fabric.

It has been determined that the thickness increase of the leno weave 100 should be fixed in some method, such as by using a binder or coating. It has been helpful to use a polymeric resin 15, as shown in the exploded view FIG. 4, which is coated and dried on a preferred tenter frame 105 equipped with clips, as shown in FIG. 5. The tenter frame 105 functions to apply the necessary tension to the warpulence of the fabric to induce the torquing effect. The clips hold the edges of the fabric as it runs through the coating line and drying oven (not shown), and are adjustable to add or subtract fabric width as needed. Applying high tension, allowing the width of the leno fabric 100 to decrease by the use of clips can increase the thickness of the fabric via the torque effect on the weft yarns created by the tensile force applied to the warp yarns 12. Although tenter frames equipped with clips 105 have been useful in practicing this invention, this invention is not so limited. "Clipless" drying systems can be used with some greater variation in the weft and thickness of the fabric. It is also believed that the magnitude of the thickness can be further enhanced by other means. One such method is to create a fabric with an "unbalanced" construction, such that the combined weight of the warp yarns is greater than the combined weight of the weft yarns. The ability of the weft yarns to resist deformation due to torque is thus reduced. Another way to accomplish greater thickness in the substrates of this invention is to use a heavier warp yarn, but less of them in the warp direction. This results in a greater amount of tension per warp yarn and a wider span of weft yarn to be acted upon. The torque effect will increase with its accompanying increase in fabric thickness.

The design of glass fabrics suitable for this invention begins with only a few fabric parameters: type of fiber, type of yarn, weave style, yarn count, and areal weight.

Fiber finish is also important because it helps lubricate and protect the fiber as it is exposed to the sometimes harsh weaving operation. The quality of the woven fabric is often determined by the type and quality of the fiber finish. The finish of choice, however, is usually dictated by end-use and resin chemistry, and can consist of resinous materials, such as epoxy.

The following fabric styles and categories are useful in the practice of this invention:

| Fabric | Areal wt. grams/m$^2$ | oz/yd$^2$ |
|---|---|---|
| Light weight | 102-340 | 3-10 |
| Intermediate weight | 340-678 | 10-20 |
| Heavy weight | 508-3052 | 15-90 |

| Fabric | Thickness μm | mil |
|---|---|---|
| Light weight | 25-125 | 1-5 |
| Intermediate weight | 125-250 | 5-10 |
| Heavy weight | 250-500 | 10-20 |

It has been determined that fabrics having an areal weight of about 15-500 grams/m$^2$ and thicknesses of about 0.025-0.25 inches are most preferred.

Increasing the thickness of the fabric 100 of this invention, without significantly adding to the cost can provide a fabric with good longitudinal strength/stiffness values, as well as transverse (fill direction) toughness and impact resistance. The ability to thicken a fabric allows it to be used in many end-uses, such as reinforcement for composites, housings, ballistic applications, aerospace and automotive applications, gypsum and cement boards, concrete reinforcement, etc.

It is also possible to "teach" the looms new tricks, particularly in three-directional weaving, but interesting modifications are even possible for two-directional fabric. The loom has the capability of weaving an endless helix using different warp and fiber fill. Alternatively, a glass textile roving warp or weft, such as E-glass yarn and olefin warp weft, such as polyethylene or polystyrene fiber, can be used. Alternatively, blends such as Twintex® glass-polyolefin blends produced by Saint-Gobain S. A., Paris, France, or individual multiple layers of polymers, elastomerics, rayon, polyester and glass filaments can be used as roving or yarn for the facing material, or as additional bonded or sewn layers of woven, knitted felt or non-woven layers.

A typical binder/glass fiber loading is about 3-30 wt %. Such binders may or may not be a barrier coating. These binders also may or may not completely coat the exterior facing fibers. Various binders are appropriate for this purpose, such as, for example, phenolic binders, ureaformaldehyde resin, or ureaformaldehyde resin modified with acrylic, styrene acrylic, with or without carboxylated polymers as part of the molecule, or as a separate additive. Additionally, these binders can be provided with additives, such as UV and mold inhibitors, fire retardants, etc. Carboxylated polymer additions to the binder resin can promote greater affinity to set gypsum, or to Portland cement-, for example, but are less subjected to blocking than resins without such additions. One particularly desirable binder resin composition is a 70 wt % ureaformaldehyde resin-30 wt % styrene acrylic latex or an acrylic latex mixture, with a carboxylated polymer addition.

Figure 4:
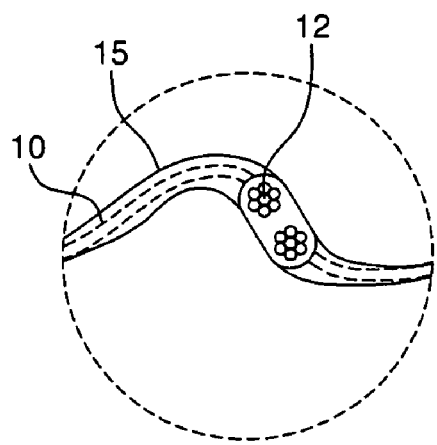
FIG. 4 is a magnified view of a cross over point for the manipulated fabric of FIG. 3.
Figure 5:
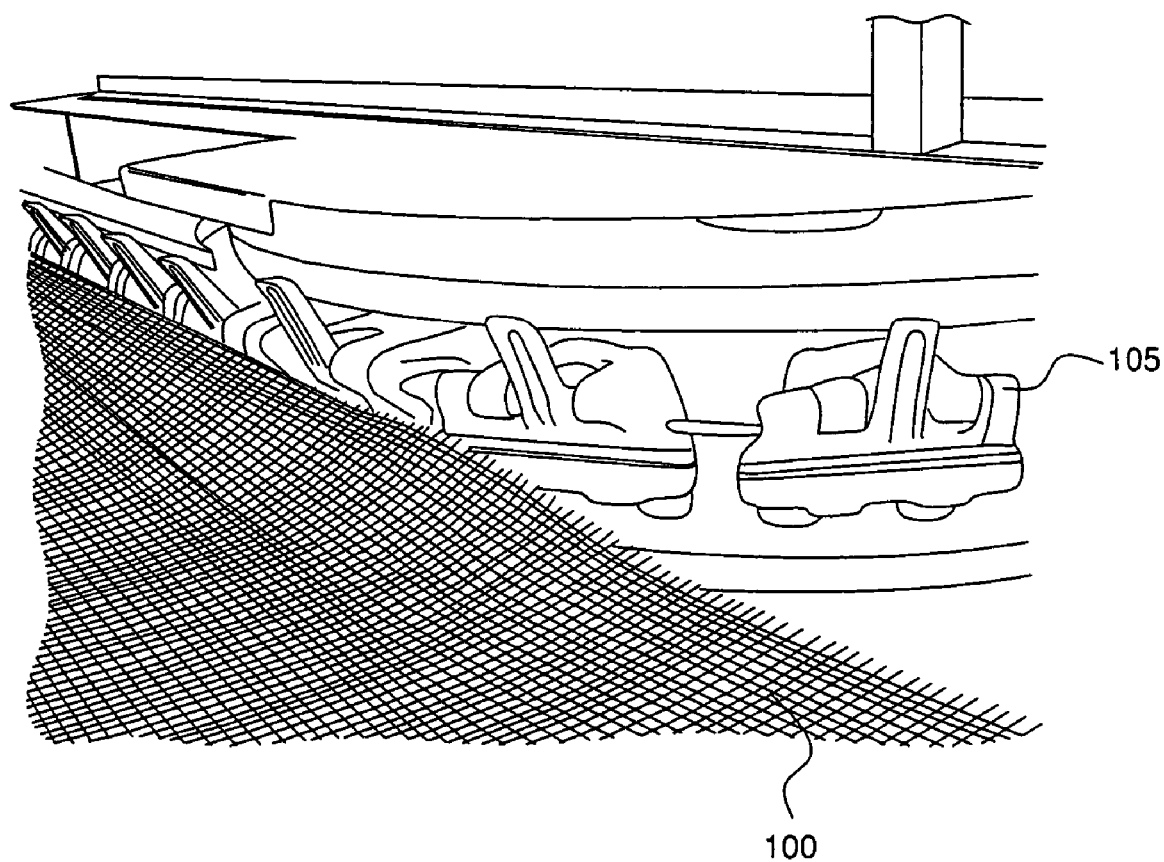
FIG. 5 is a front perspective view of a preferred manufacturing embodiment in which the fabric of FIG. 1 is held by clip chains of a tenter frame.

The fabric 101 or thickened fabric 30 of this invention can be further treated or coated with a resinous coating 15 prior to use, to help fix the weft fibers 10a and 10b in a preferred sinusoidal pattern, as shown in FIGS. 3 and 4. Resinous coatings 15 are distinguished from the sizing or binder used to bond the fibers together to form the individual layers, as described above. Coatings 15 can include those described in U.S. Pat. No. 4,640,864, which is hereby incorporated herein by reference, and are preferably alkali-resistant, water-resistant and/or fire-retardant in nature, or include additives for promoting said properties. They are preferably applied during the manufacture of the fabric 101 or thickened fabric 30.

The coating 15 applied to the fabric 101, as shown in FIG. 4, of this invention preferably coats a portion of the fibers, and binds the yarns 10 and 12 together. Alternatively, the coating 15 can increase or decrease the wetting angle of the matrix to reduce penetration into the yarns or increase adhesion. The coating 15 can further contain a UV stabilizer, mold retardant, water repellant, a flame retardant and/or other optional ingredients, such as dispersants, catalysts, fillers and the like. Preferably, the coating 15 is in liquid form and the fabric 101 is led through the liquid under tension, such as by a tenter frame 105, or the liquid is sprayed (with or without a water spray precursor) on one or both sides of the fabric 101. Thereafter, the fabric 101 may be squeezed and dried.

Various methods of applying the liquid may be used, including dip-coaters, doctor blade devices, roll coaters, and the like. One preferred method of treating the fabric 101 with the resinous coatings 15 of this invention is to have a lower portion of one roll partially submerged in a trough of the liquid resinous composition and the fabric 101 pressed against the upper portion of the same roller so that an amount of the resinous composition is transferred to the fabric 101. The second roller above the first roller controls the movement of the fabric 101 and the uniformity of the amount of resinous coating 15 disposed thereon. Thereafter, the coated fabric 101 is led in a preferred method to steam cans to expedite drying. It is preferred to pass the coated fabric over steam cans at about 250-450° F. (100-200° C.) which drives the water off, if a latex is used, and additionally may cause some flow of the liquid resinous material to further fill intersticies between fibers, as well as coat further and more uniformly fibers within the fabric 101. The coating preferably covers about 50-80% of the surface area targeted, more preferably about 80-99% of said area.

The preferred resinous coatings 15 of this invention can contain a resinous mixture containing one or more resins. The resin can contain solid particles or fibers which coalesce or melt to form a continuous or semi-continuous coating which substantially prevents the penetration of liquid moisture, which can be alkaline. The coating can be applied in various thicknesses, such as for example, to sufficiently cover the fibrous constituents of the fabric 100 so that no fibers protrude from the coating 15, or to such a degree that some of the fibers protrude from the coating 15.

The coating 15 of this invention can be formed substantially by the water-resistant resin, but good results can also be achieved by forming the coating or saturant from a mixture of resin and fillers, such as silicates, silica, gypsum, titanium dioxide, and calcium carbonate. The coating 15 can be applied in thermoplastic, latex, or curable thermosetting form. Acceptable resins include pvc plastisol, styrene/butadiene (such as BASF ND 5600) and styrene/acrylic copolymer, acrylics (such as Paranol SA200 or Rohm & Haas GL 618), flame retardant acrylics or brominated monomer additions to acrylic, such as Pyropoly AC2001, poly(vinyl acetates), poly(vinyl alcohols), vinylidene chloride, siloxane, and polyvinylchloride such as Vycar® 578. Thermosetting resins, such as vinyl esters, epoxy, or polyester, could also be used for higher strength and rigidity. In addition, fire retardants, such as bromated phosphorous complex, halogenated paraffin, colloidal antimony pentoxide, borax, unexpanded vermiculite, clay, colloidal silica, and colloidal aluminum can be added to the resinous coating or saturant. Furthermore, water resistant additives can be added, such as paraffin, and combinations of paraffin and ammonium salt, fluorochemicals designed to impart alcohol and water repellency, such as FC-824 from 3M Co., organohydrogenpolysiloxanes, silicone oil, wax-asphalt emulsions and poly(vinyl alcohol) with or without a minor amount a minor amount of poly(vinyl acetate). Finally, the coatings 15 can include pigment, such as kaolin clay, or lamp black thickeners.

EXAMPLE A

This trial was undertaken to prove the efficacy of inducing significant thickness increases (in the "Z" plane) into an open, leno weave fabric of unbalanced construction.

When the collective weight of warp yarns significantly outweighs that of the weft yarns, a noticeable torque effect is induced in the warp yarns when under tension on the finishing machines. The torque effect causes the weft yarns to deform in a sinusoidal fashion across the width of the web, and thus the fabric thickness increases.

Calculations have shown that a fabric based on existing fabric style No. 0061 by Saint-Gobain Technical Fabrics, St. Catharines, Ontario, Canada, will serve as a useful starting point for development in that it has approximately the right construction and cost. The 0061 fabric was modified to unbalance the construction by replacing the 735 tex weft yarn with a 275 tex yarn. This both reduces the fabric cost and helped ensure that the torque effect would be observed. A stiff, inexpensive SBR (styrene-butadiene rubber) latex was selected (style 285) for the coating as it has the advantage of low cost; alkali resistance; the excellent toughness needed to bond the open fabric. Frame D was selected as the finishing machine for two reasons: it is capable of coating two 1.2 meter panels side-by-side; and the clips of the tenter frame 105 would serve to control the width of the fabric as the torque effect takes place. Without the clips, it is expected that the width of the fabric would be difficult to control on the finishing line.

Results and Recommendations

It was found that the thickness of the fabric could be increased 0.5-100 times that of the same fabric without the torque effect. The observed increase was a 2.7 times increase, from 0.54 mm to 1.46 mm. This was accomplished by applying the highest amount of tension possible to the fabric on Frame D, and then slowly decreasing the width of the clips. The fabric width decreased from 2465 mm to 2380 mm (about 3.4%), which is a loss of 85 mm (3.3 inches). The fabric was not unduly distorted by the process, and with some fine-tuning the quality should be acceptable. Two rolls of 45.7 meter length and two of 30 meter length of the enhanced thickness fabric were produced.

Details of Trial

| | |
|---|---|
| Machine: | frame D |
| Line Speed: | 25 meters/min |
| Oven Temp: | 185/185° C. |
| Winder: | center wind |
| Let-off pressure: | 140 psig |
| Front output press.: | 8 psig |
| Tension: | 15 |
| Clip spacing: | 93 inches |

Fabric Analysis

| | |
|---|---|
| Finished Width of one panel: | 1190 mm (1202 mm including fringe edge). |
| Yarn Count: | 20.64 × 10.0 ends/picks per 10 cm |
| Coated Fabric Weight: | 113.4 grams/m2 |
| Coating Add-on: | 31.9% |
| Thickness: | 1.46 mm (0.058 inches) |

Embodiments of the present invention involve the way that the machine direction yarns (also known as warp yarns) in each leno group are drawn into the loom. If each leno group is drawn into the loom in the same manner, such that each leno group or yarns 12 of FIG. 4 twists in the same direction, the weft yarn assumes the shape of an "S", as shown on the left side of FIG. 6. In other words, the weft yarn 10 of FIG. 4, as viewed in the plane of the fabric and between two adjacent warp yarns, forms an "S" shape. There is an inflection point in the weft yarn between the two warp groups. Thus, the weft yarn 10 forms two full wave length between alternating warp yarns 12, as seen in FIG. 6.

Figure 6:
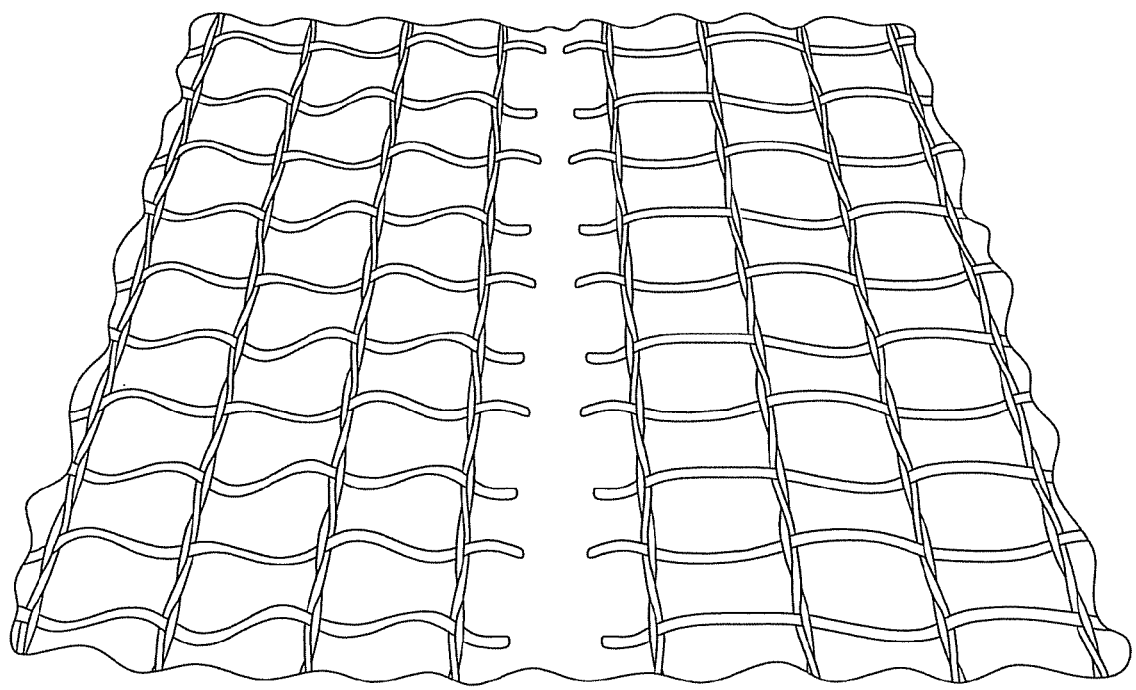
FIG. 6 is a split view of side-by-side production fabric samples showing the "S" version of FIG. 3 on the left, and the "C" version on the right.
Figure 7:
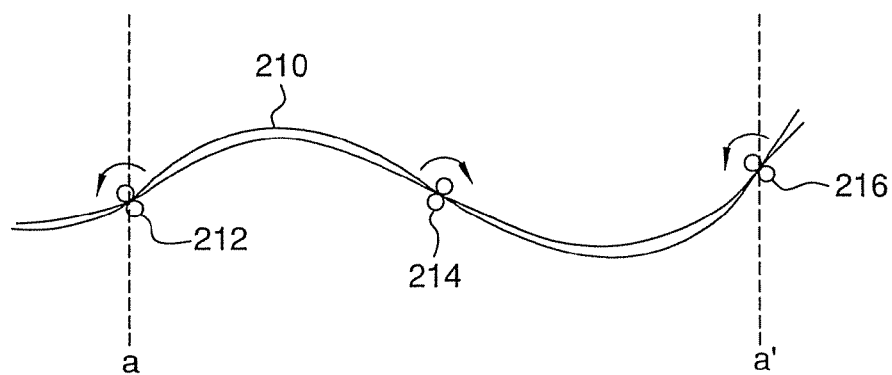
FIG. 7 is an enlarged front plan view of the "C" version fabric of FIG. 6, showing adjacent warp yarns having opposite twists and a single wave formation between alternating warp yarns.

If the warp yarns are drawn into the loom such that each leno group 212, 214 and 216 has an alternating direction of twist, as shown on the right of the split view photograph of FIG. 6, then the weft yarn assumes a "C" shape when viewed in the plane of the fabric between two warp groups. This "C" configuration has proven to be more efficient in achieving the increased thickness. First, less yarn is needed in the weft direction to achieve a given thickness than the "S" configuration since the yarn travels a more direct route between warp groups. Also, experience in producing the "C" fabric has shown that the thickness is very constant across the width of the web. With the "S" configuration, there was a significant variation in fabric thickness across the width, and it was nearly impossible to remove during processing on the coater. The thickness generally increased from one side of the fabric to the other in a gradual way. As such, the "C" version permits the weft yarn 210 to form only a single wave length between two alternating weft yarns 212 and 216, demarked by boundary lines a-a' in FIG. 7.

Alternatively, a scrim fabric can be manipulated, even if the warp and weft yarns or groups are not interwoven by fixing the cross-over points with a binder, size or adhesive, prior to partially untwisting the warp yarns to undulate the weft yarns. While the weft yarns are undulated, the fabric is coated with a resinous coating, thus fixing the weft yarns in their undulated "C" or "S" configurations, for example.

From the foregoing, it can be realized that this invention provides thicker, more consistent thickness, open mesh fabrics and methods for their manufacture. These fabrics will have greater ability to reinforce matrices in a vertical or "Z" direction, without substantially increasing the cost of the reinforcement. Although various embodiments have been illustrated, this was for the purpose of describing, and not limiting, the invention. Various modifications, which will become apparent to one skilled in the art, are within the scope of the invention described in the attached claims.

We claim:

1. A fabric comprising:
an open woven layer including warp yarns and interwoven with weft yarns, wherein said warp yarns comprise adjacent warp yarns twisted together, and wherein at least a pair of said adjacent warp yarns are provided with alternating directions of twist; said pair of said adjacent warp yarns being mechanically manipulated by applying tension thereto to at least partially untwist and apply torque on each weft yarn, causing said each weft yarn to assume a sinusoidal profile having a generally "C" shaped configuration between said pair of said adjacent warp yarns, wherein the thickness of the fabric as measured from the high point and the low point of the sinusoidal profile of the weft yarn increases; and a polymeric coating disposed over at least portions of said pair of adjacent warp yarns and at least portions of said each weft yarn so as to retain said generally "C" shaped configuration.

2. The fabric of claim 1 wherein said warp and weft yarns comprise polymeric yarns, inorganic yarns, or both.

3. The fabric of claim 1 wherein said weft and warp yarns comprise glass yarns.

4. The fabric of claim 1 wherein said weft yarns assume said sinusoidal profile to increase the layer's thickness by at least about 50%.

5. The fabric of claim 1 wherein each said weft yarn forms the sinusoidal profile with one full wave length beginning and ending approximately at warp yarn intersection points.

6. A corrosion-resistant fabric for use as a reinforcement in a matrix, comprising:
a woven, braided, scrim-type or knitted open fabric comprising high strength, non-metallic weft yarns and warp yarns, wherein said warp yarns comprise adjacent warp yarns twisted together, and at least a pair of said adjacent warp yarns are provided with alternating directions of twist; said pair of said adjacent warp yarns being mechanically manipulated by applying tension thereto to untwist at least partially and apply torque to the weft yarns; and causing each of the weft yarns to form a generally "C" shaped configuration of a sinusoidal profile between said pair of adjacent warp yarns, wherein the thickness of the fabric as measured from the high point and the low point of the sinusoidal profile increases by at least about 50%; and a bonding agent for retaining said weft and warp yarns in a relatively fixed position.

7. The fabric of claim 6 wherein said fabric comprises a leno weave.

8. The fabric of claim 7 wherein said weft and warp yarns are spaced apart by at least about 1 mm.

9. The fabric of claim 7 wherein said adjacent warp yarns are twisted in opposite directions.

10. The fabric of claim 7 wherein said warp yarns are subjected to a tensile force which assists in causing said weft yarns to become undulated to a height of at least 1 mm.

11. The fabric of claim 7 wherein said warp yarns have a combined weight which is greater than the combined weight of the weft yarns.

12. The fabric of claim 7 wherein a portion of said warp yarns are heavier than a portion of said weft yarns, said warp yarns are fewer in number than said weft yarns, or both.

13. A matrix reinforcement comprising:

an open, woven fabric comprising interwoven weft yarns and twisted together warp yarns, at least some of the twisted together warp yarns being at least partially untwisted by tension applied thereto to apply torque to each of the weft yarns causing each said weft yarns to undulate into a sinusoidal profile comprised of "C" shaped configurations having inflection points located substantially only at intersection points with said twisted together warp yarns, wherein the thickness of the fabric as measured from the high point and the low point of the sinusoidal profile increases; and a polymeric resin coating substantially binding said weft yarns in the sinusoidal profile.

14. The reinforcement of claim 13 wherein said polymeric resin comprises styrene butadiene rubber, acrylic, styrene acrylic, or combinations or derivatives thereof.

15. The reinforcement of claim 14 bonded to a matrix comprising an organic or inorganic material.

16. The reinforcement of claim 14 wherein the sinusoidal profile of each of said weft yarns comprises a substantially full wave length.

17. The reinforcement of claim 14 wherein adjacent ones of said weft yarns of said fabric have different sinusoidal-like patterns which are not overlapping when observed from the plane of the fabric.

* * * * *